United States Patent
Blackburn

(10) Patent No.: US 6,547,264 B1
(45) Date of Patent: Apr. 15, 2003

(54) SERVICE CART WITH LEG EXTENDERS AND RETROFIT KIT THEREFOR

(75) Inventor: John H. Blackburn, Greenville, SC (US)

(73) Assignee: Sunex International, Inc., Greenville, SC (US)

( * ) Notice: Subject to any disclaimer, the term of this patent is extended or adjusted under 35 U.S.C. 154(b) by 0 days.

(21) Appl. No.: 09/989,613

(22) Filed: Nov. 19, 2001

(51) Int. Cl.[7] .................................................. B62B 11/00
(52) U.S. Cl. ............................ 280/47.35; 108/144.11; 248/188.2; 16/32
(58) Field of Search ...................... 280/651, 47.34, 280/47.35; 108/147.19, 147.21, 144.11; 248/188.2, 188.3, 188.4, 188.5; D6/495, 496; 16/32

(56) References Cited

U.S. PATENT DOCUMENTS

| | | | | |
|---|---|---|---|---|
| 996,636 A | * | 7/1911 | Gabriel | 280/47.35 |
| 1,437,670 A | * | 12/1922 | Mazoch | 108/147.21 |
| 1,707,363 A | * | 4/1929 | Opremchak | 248/188.2 |
| 2,750,709 A | * | 6/1956 | Saverino | 248/188.2 |
| 2,886,186 A | * | 5/1959 | Hamilton | 280/47.35 |
| 3,088,785 A | * | 5/1963 | Schuette | 108/147.21 |
| 5,107,775 A | * | 4/1992 | Langlais et al. | 108/144 |
| 5,335,754 A | * | 8/1994 | Gibson | 182/204 |
| 5,647,286 A | * | 7/1997 | Dunn | 108/144 |
| D400,334 S | | 10/1998 | Hawkins | |
| 6,189,459 B1 | * | 2/2001 | DeAngelis | 108/96 |
| 6,343,890 B1 | * | 2/2002 | Benson | 403/329 |
| 6,354,231 B1 | * | 3/2002 | Morris | 108/144.11 |

FOREIGN PATENT DOCUMENTS

| | | |
|---|---|---|
| CH | 277595 | 12/1951 |
| JP | 7-327745 | 12/1995 |

OTHER PUBLICATIONS

Mac Tool Catalog (1997), p. 17.
Snap on Catalog (1997–1998), p. 41.
Astro Pneumatic (1996), p. 121.
Napa Catalog (1994), p. 11.

* cited by examiner

Primary Examiner—Brian L. Johnson
Assistant Examiner—Bryan Fischmann
(74) Attorney, Agent, or Firm—Dority & Manning, P.A.

(57) ABSTRACT

A service cart leg extender assembly for attachment to a leg of a service cart that lengthens the leg of the service cart to a chosen length. The leg extender assembly includes an apparatus that augments the leg of the service cart through an easy to accomplish, reversible effect. The leg extender assembly disposes the components of the service cart at a higher elevation without diminishing stability of the service cart. The leg extender assembly is also embodied in a two portion apparatus with an upper portion including a notch that allows for securing the leg extender assembly to a leg of the service cart. The leg extender assembly is also embodied in a two portion apparatus with an upper portion including a hole that allows for securing the leg extender assembly to a leg of the service cart. One such leg extender is connected to each leg of the service cart to be elevated. These leg extenders dispose the support surfaces of the service cart at higher elevations above the ground than conventional service carts.

12 Claims, 5 Drawing Sheets

SERVICE CART WITH LEG EXTENDERS AND RETROFIT KIT THEREFOR

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to mechanics' service carts and more particularly to mobile mechanics' service carts.

Mechanics employ carts for holding tools and parts. As shown in FIG. 1 for example, such mechanics' carts 10 typically are rendered mobile by having casters 26 connected to the lower ends of each of a plurality of legs 12. Such carts typically have a rectangular footprint and one of four legs 12 disposed at each corner of the cart. The upper portions of a pair of legs can be joined to form a handle 22 at each end of the cart 10. Such carts typically have an upper frame 18 supporting an upper tray 20 and a lower frame 14 supporting a lower tray 16, with each frame connected near its corners to the legs of the cart. In addition to providing support for resting tools and parts, each frame and tray provides rigid support for maintaining the physical integrity of the cart.

The height at which each tray resides is typically not adjustable. The height of the upper tray 20 above the floor with the casters is typically on the order of 32 inches. There are numerous occasions when it would be desirable to have the height of the trays at a somewhat higher elevation. For example, when the mechanic has a vehicle elevated on a hydraulic lift and is working beneath the vehicle, disposing the tray at a level closer to the height where the mechanic is working beneath the vehicle is desirable. Propping the four wheels of the cart on blocks is unstable. In another example, when the mechanic is of taller build, conventional mechanics' service carts are not only inconvenient but sometimes a dangerous obstacle to performing a task. In this situation a mechanic's service cart with a more readily disposed tray is desirable for reasons of both comfort and safety. In still another example, automobiles and engines are expensive and complex. When a mechanic is performing a task on an engine or automobile, the smallest error or break in concentration can become a costly mistake. Disposing the tray of the mechanic's service cart at a height more readily accessible relative to the position of the engine or automobile that the mechanic is concerned with decreases the likelihood of the mechanic making a costly mistake. For the foregoing reasons, there is a need for an apparatus that increases the operating height of support surfaces on conventional mechanics' service carts.

OBJECTS AND SUMMARY OF THE INVENTION

It is a principal object of the present invention to provide a mechanic's service cart that disposes a support surface for tools and parts at a higher elevation than conventional mechanics' service carts.

It is also a principal object of the present invention to provide a retrofit kit that enables a user to extend the height of the support surfaces of a conventional mechanic's service cart that is easy to accomplish, reversible, and does not diminish the stability of the resulting retrofitted cart.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a mechanic's service cart can comprise a plurality of legs and a frame, wherein each leg is of a certain desired length and is connected to the frame. The mechanic's service cart can include a support tray connected to the frame and handles formed by connecting the upper portions of the legs. The mechanic's service cart can also include one or more leg extender assemblies that engage the legs of the mechanic's service cart in a way that extends the length of the leg. Each leg of the mechanic's service cart is configured to receive a caster that allows for mobile use of the mechanic's service cart.

The accompanying drawings, which are incorporated in and constitute a part of this specification, illustrate presently preferred embodiments of the invention and, together with the description, serve to explain the principles of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
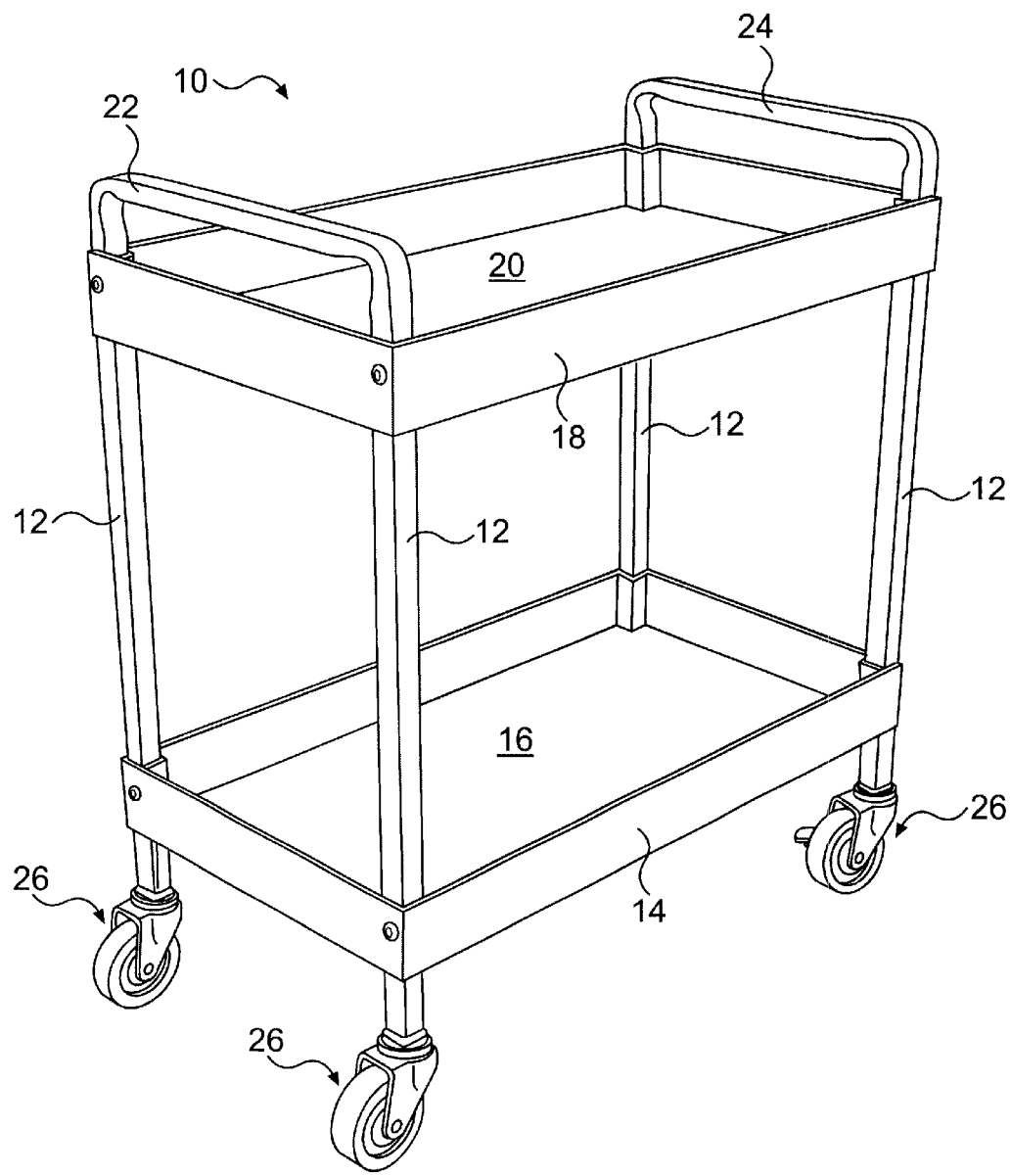
FIG. 1 shows a conventional mechanic's service cart from an elevated perspective view.
Figure 2:
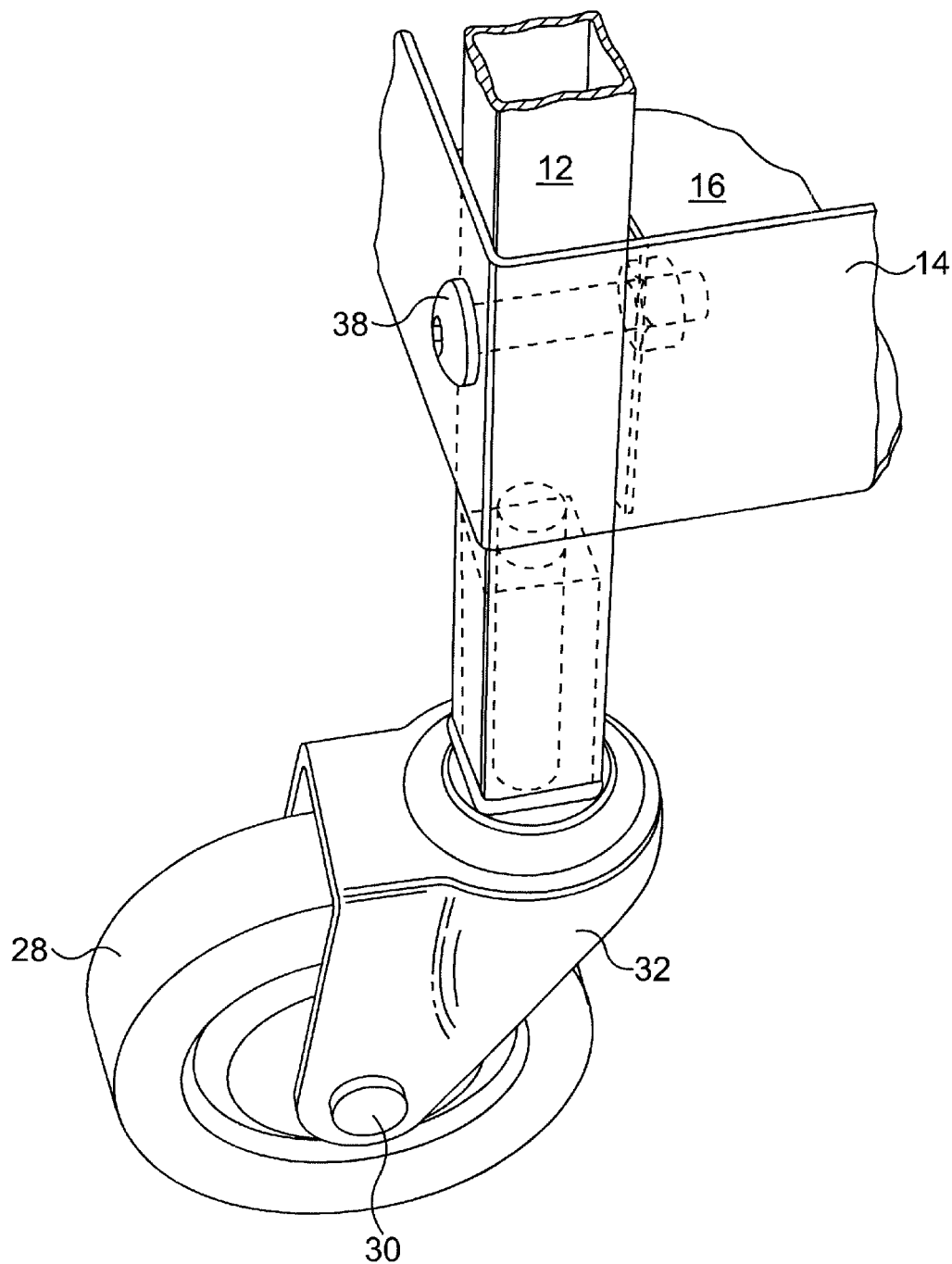
FIG. 2 shows a portion of a conventional mechanic's service cart from an elevated perspective view with some components shown in phantom (dashed line)

The cart of the presently preferred embodiment of the invention shares some features in common with a conventional cart 10 shown in FIG. 1, and these common features will not be referenced at length in the following description, which will focus on the features that transform a conventional cart 10 into the cart 11 of the present invention.

As in a conventional service cart 10, the mechanic's service cart 11 of the present invention includes a plurality of legs 12. As embodied herein and shown in FIGS. 3 and 5B for example, each leg 12 is defined as an elongated tubular member having a predetermined length that extends in an axial direction (indicated by the chain-dashed line designated 13 in FIG. 3). At least three legs 12 are typically is provided for the cart 11. However, similar to the conventional cart 10 shown in FIG. 1 for example, four legs 12 can be used to form a configuration that produces a rectangular footprint.

Each leg 12 can include an upper portion and a lower portion. Each upper portion of each leg can include an upper end. Each lower portion of each leg can include a lower end that is disposed generally opposite the upper end of the same leg. In much the same way as in the conventional cart 10 shown in FIG. 1 for example, a handle 22 can be provided with opposite ends. One of the ends of handle 22 can be joined to the upper end of a first leg 12. The other one of the ends of handle 22 can be joined to the upper end of a second leg 12. A similar arrangement can be provided for a second handle 24. Desirably, as in the conventional cart 10 shown in FIG. 1 for example, each handle 22 or 24 forms part of a unitary tubular member that is bent with two right angles to form a pair of legs 12 connected by the handle 22 or 24.

Figure 3:
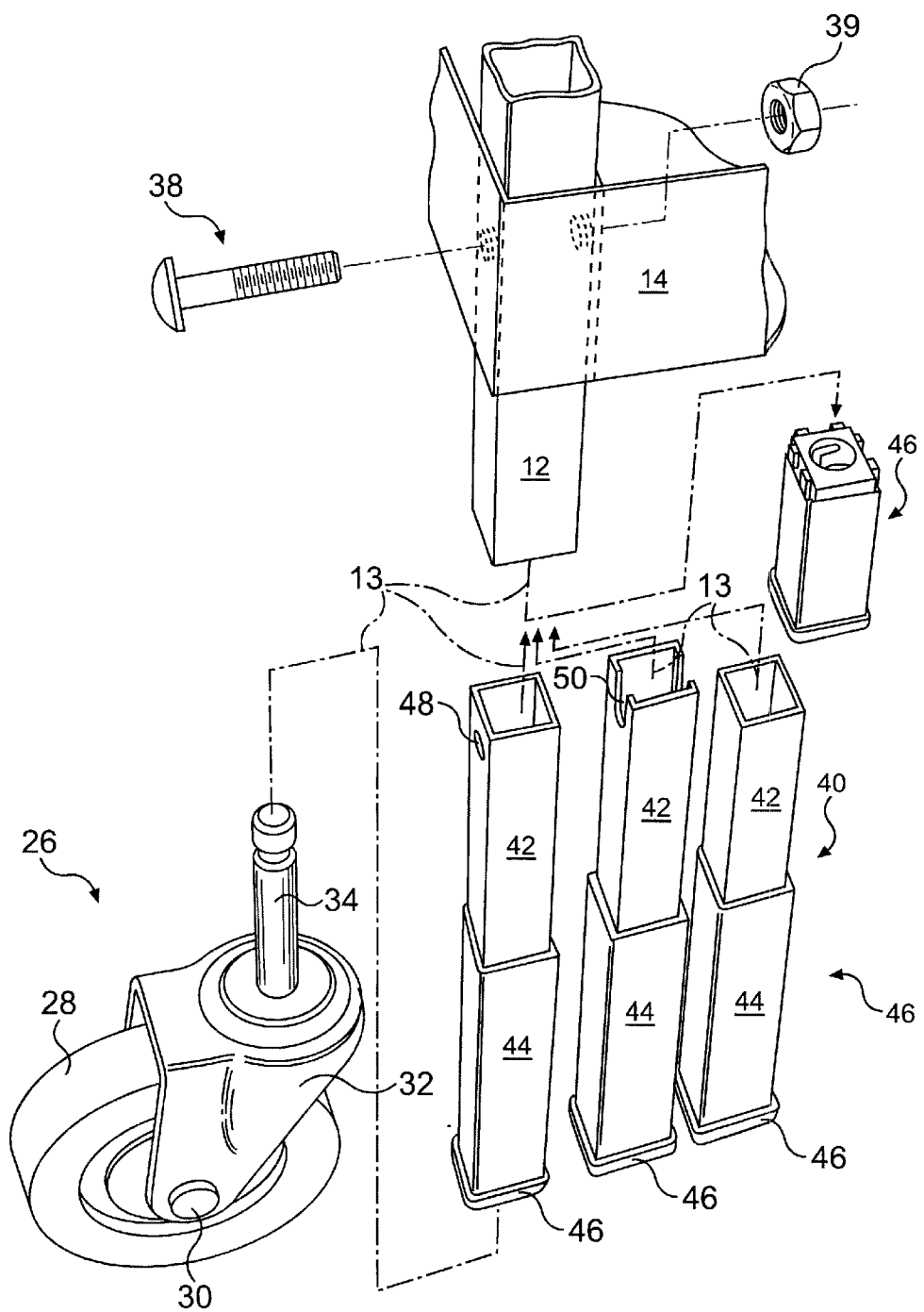
FIG. 3 shows three alternative embodiments of components according to the present embodiment of the invention from an elevated perspective view with chain dashed lines indicating assembly positioning of the components.
Figure 4:
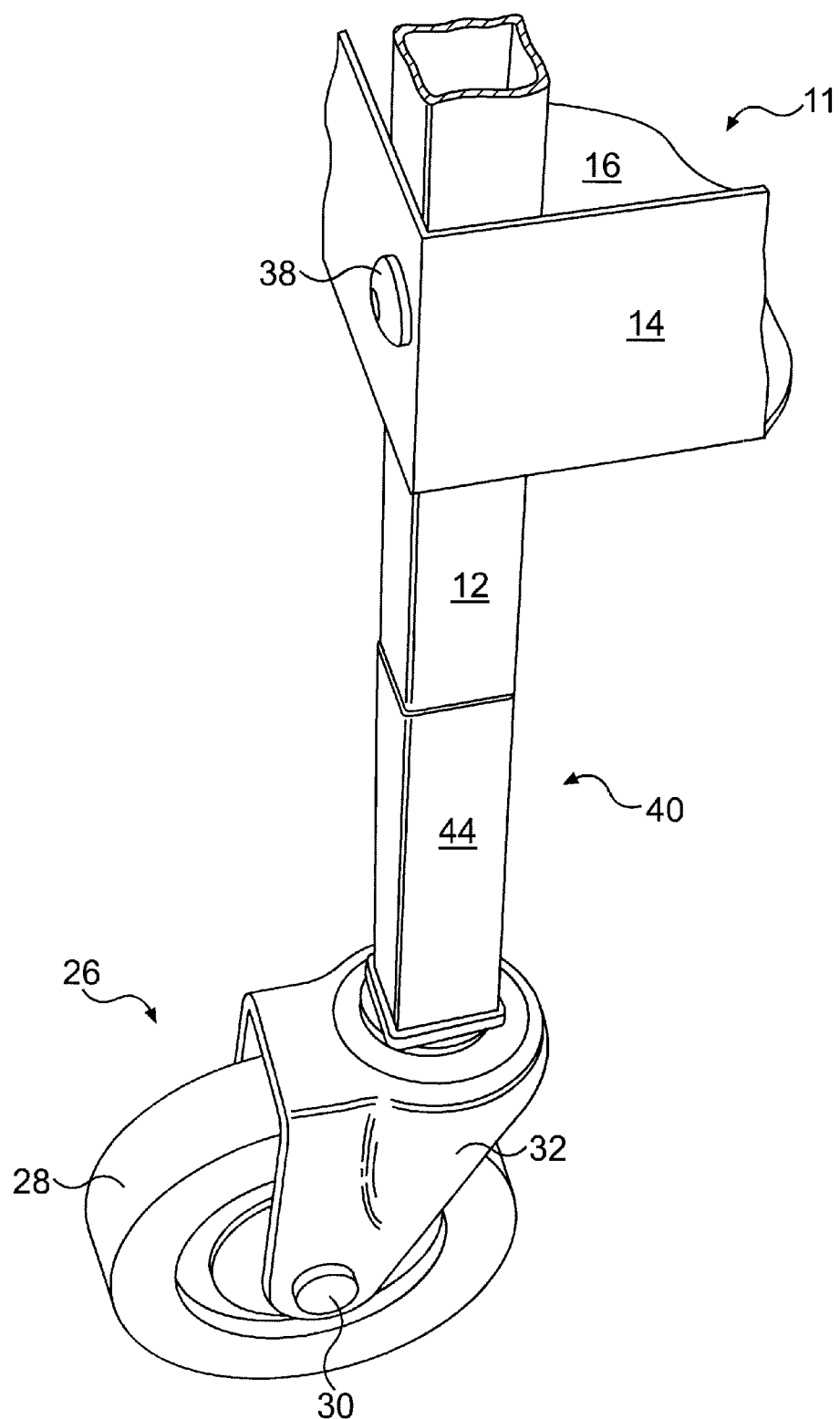
FIG. 4 shows one presently preferred embodiment of components in accordance with the present invention from an elevated perspective view.

The presently preferred embodiment of the cart of the present invention also includes at least one frame that is connected to each of the legs. Desirably, a lower frame such as the one designated 14 that carries a lower support tray 16 is provided in much the same fashion as in a conventional cart 10 shown in FIG. 1 for example. Similarly, the cart 11 of the present invention also desirably, includes an upper frame 18 that carries an upper tray 20 in much the same fashion as shown in the conventional cart 10 in FIG. 1 for example. Each leg, 12 is connected to an upper frame 18 near the upper frame's corners and to a lower frame 14 near the lower frame's corners. As shown in FIG. 4 for example, one of a plurality of bolts 38 secures each leg 12 to the lower frame 14. As shown in FIG. 3 for example, each frame, whether it be lower frame 14 or upper frame 18, desirably is connected to each of the legs 12 by a bolt 38 that is received through coincident holes provided through the frame and the leg 12. As shown in FIG. 3, each bolt 38 can be secured by a threaded nut 39 that is threaded onto a threaded end of bolt 38. Other mechanical fasteners can be used, and a washer (not shown) also can be disposed between the nut 39 and the back surface of the leg 12.

In accordance with the present invention, a separate leg extender is provided to engage each one of the legs so as to form an integrated vertically extending support element that extends axially in a manner that augments the length of the leg. Details regarding the structure and configuration of the leg extender assembly 40 are illustrated in FIGS. 3 and 4. In the presently preferred embodiment illustrated in FIG. 3 for example, the leg extender assembly 40 includes a first portion 42 and a second portion 44. The first portion 42 of leg extender assembly 40 engages a leg 12 so as to form an integrated support element extending in the axial direction, which is represented by the chain-dashed lines designated 13. In this way, each leg extender 40 augments the length of the leg 12 that is engaged by the leg extender 40.

Figures 5A, 5B:
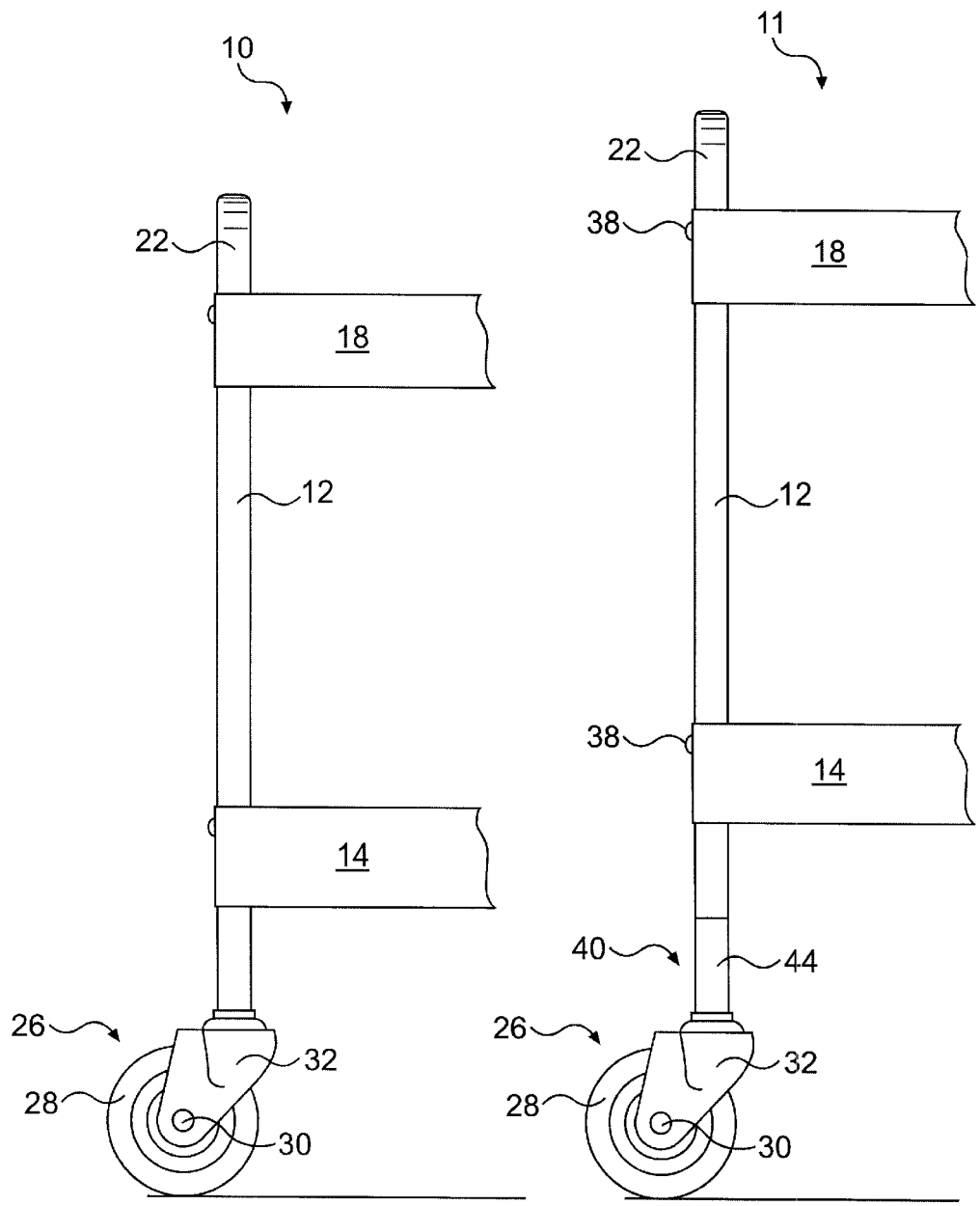
FIG. 5A shows components of a conventional mechanic's service cart from a partial side plan view.
FIG. 5B shows components of a presently preferred embodiment according to the present invention from a partial side plan view comparable to the view shown in FIG. 5A.

The first portion 42 of each leg extender 40 is contiguous with each second portion 44 of each leg extender 40. Each first portion 42 defines a first outer perimeter that is transversely oriented relative to the axial direction 13 shown in FIG. 3 for example. The outer perimeter of first portion 42 desirably is smaller than the transversely oriented outer perimeter of second portion 44. Moreover, the configuration of the outer perimeter of first portion 42 is designed so that it can be snuggly fitted into the internal hollow cavity that is defined within the lower portion of each leg 12. This permits the first portion 42 of each extender 40 to fit telescopically within the lower portion of each leg 12. The outer perimeter of each leg 12 desirably is configured to conform to the second outer perimeter of each second portion 44 of each extender 40. This is illustrated in both FIGS. 3 and 5B for example. FIGS. 4 and 5B depict a typical application of a leg extender assembly 40 of the invention, where only a second portion 44 is visible, to dispose a support surface (such as the ones designated 16, 20 in FIG. 1) of a service cart 11 to a higher elevation than conventional service carts.

A bearing insert designated by the numeral 46 is received within the second portion 44 of each leg extender assembly 40. Each bearing insert comprises an insert member 46 that is configured to extend in an axial direction. Each insert member 46 is further configured to be press-fit into each hollowed interior of each second end 44 of a leg extender 40 in much the same way that each insert 46 would be received within the hollowed interior portion of the lower end of each leg 12. In a retrofit situation, the insert 46 would be extracted from within the hollowed portion of the lower end of each leg 12 and re-inserted into the second end 44 of a leg extender 40. Alternatively, the extracted insert 46 could be discarded, and a new insert 46 could be introduced into the hollow cavity within the second end 44 of a leg extender 40.

Each leg 12 extender 40 is provided with a caster 26. The casters 26 allow for the mobile use of the service cart 11. As in the conventional cart 10, each caster 26 of the inventive service cart 11 includes a wheel 28 that is rotatably connected to an axle 30. An axle support assembly designated by the numeral 32 carries and supports the axle 30. The axle support assembly 32 is connected to a rigid shaft 34. The rigid shaft 34 of each caster 26 is rotatably received within the hollow cylindrical channel formed axially in a bearing insert 46.

Extending the length of the legs 12 of the service cart 11 by using the leg extender assemblies 40 may be accomplished in a variety of leg extender assembly configurations. FIG. 3 illustrates three different embodiments of leg extender 40. In the embodiment shown to the right of FIG. 3, first portion 42 is held within the hollowed out interior of a leg 12 by a press fit into leg 12. Accordingly, in this manner first portion 42 engages leg 12 in a press fit mechanical arrangement. Such a press fit arrangement is desirable so that there is no rattling that would occur upon a looser fit, which in any event is a further alternative embodiment.

In another alternative embodiment shown to the left in FIG. 3 for example, a hole 48 is provided and positioned so that when first portion 42 of extender 40 is completely received within the hollow interior cavity of a respective leg 12, hole 48 aligns with the holes in the leg 12 and the frame, 14 to receive bolt 38 through such coincidentally aligned holes. This requires such bolts to be removed before this embodiment of the leg extender can be inserted axially into the lower end of the leg 12.

Yet another alternative embodiment shown in FIG. 3 between the other two depicted embodiments provides a notch 50 through the free end of first portion 42 of extender 40. Notch 50 is configured to straddle bolt 38 that is used to attach lower frame 14 to the legs 12. In this latter embodiment, there also desirably is a press fit between first portion 42 and the hollow interior cavity of the respective leg 12.

While a preferred embodiment of the invention has been described using specific terms, such description is for illustrative purposes only, and it is to be understood that changes and variations may be made without departing from the spirit or scope of the following claims.

What is claimed is:

1. A mechanic's service cart comprising:
   a plurality of legs;
   each said leg being defined as an elongated tubular member of a first predetermined length in an axial direction;
   a lower frame, each said leg being connected to said lower frame;
   at least one leg extender, said at least one leg extender comprising a truncated tubular member, said at least one leg extender including a first end and a second end disposed generally opposite said first end, said first end of said at least one leg extender engaging one of said legs to form an integrated support element extending axially in a manner augmenting said first predetermined length;
   at least one caster, said at least one caster including an axle, a wheel carried by said axle, an axle support assembly connected to said axle and a rigid shaft attached to said axle support assembly, said rigid shaft engaging said second end of said at least one leg extender;
   at least one bearing insert, said at least one bearing insert extending in said axial direction and comprising an insert member, said at least one bearing insert engaging said second end of said at least one leg extender, said at least one bearing insert engaging said rigid shaft of said at least one caster;
   plurality of fasteners, one of said fasteners securing one of said legs to said lower frame; and
   wherein said at least one leg extender is configured to have a hole receiving said one of said fasteners securing one of said legs to said lower frame.

2. The mechanic's service cart of claim 1, further comprising a lower tray configured to support a load, said lower tray being carried by said lower frame.

3. The mechanic's service cart of claim 1, further comprising an upper frame, each said leg including an upper portion and a lower portion, each said upper portion of each said leg being connected to said upper frame.

4. The mechanic's service cart of claim 3, further comprising an upper tray configured to support of a load, said upper tray being carried by said upper frame.

5. The mechanic's service cart of claim 1, wherein said plurality of legs comprises a first leg, a second leg and a third leg.

6. The mechanic's service cart of claim 5, further comprising a handle having opposed ends, each said leg including an upper portion and a lower portion, each said upper portion including an upper end and each said lower portion including a lower end disposed generally opposite said upper end, one of said ends of said handle being joined to said upper end of said first leg and the other one of said ends of said handle being joined to said upper end of said second leg.

7. The mechanic's service cart of claim 1, wherein said at least one leg extender further comprises:
   a first portion and a second portion, said first portion being contiguous with said second portion, said first portion defining a first outer perimeter transversely oriented relative to said axial direction of said at least one leg extender;
   one of said legs defining a second outer perimeter, said first outer perimeter conforming to said second outer perimeter; and
   said second portion of said at least one leg extender defining a third outer perimeter transversely oriented relative to said axial direction of said at least one leg extender, said third outer perimeter configured to be received within one of said legs.

8. A mechanic's service cart, comprising:
   a first leg, a second leg, a third leg and a fourth leg, each said leg being defined as an elongated tubular member of a first predetermined length in an axial direction, each said leg including an upper portion and a lower portion, each said upper portion including an upper end and each said lower portion including a lower end disposed generally opposite said upper end;
   a tray being defined as a rigid load-bearing surface, said tray being carried between each said leg;
   a plurality of leg extenders, each said leg extender comprising a tubular member extending in an axial direction with a first portion and a second portion, each said first portion including a first end and each said second portion including a second end disposed generally opposite said first end, each said first portion being contiguous with each said second portion, each said first end of each said leg extender engaging one of said legs, each said second end defining a first opening, each said leg extender being of smaller axial length than one of said legs;
   a plurality of casters, each said caster comprising an axle, a wheel carried by said axle, an axle support assembly connected to said axle and a rigid shaft attached to said axle support assembly, each said rigid shaft engaging said second end of one of said leg extenders;
   a plurality of bearing inserts, each said bearing insert comprising an insert member extending in said axial direction, each said bearing insert being received in said first opening and press-fit into said second end of one of said leg extenders; and
   a plurality of fasteners, wherein each said first portion of each said leg extender defines a hole, one said fastener securing one said legs to said tray, each said hole receiving said one fastener.

9. The mechanic's service cart of claim 8, further comprising a first handle including a first tubular bar having generally opposed ends, one of said ends of said first handle engaging said upper end of said first leg and the other one of said ends of said first handle engaging said upper end of said second leg.

10. The mechanic's service cart of claim 9, further comprising a second handle including a second tubular bar having generally opposed ends, one of said ends of said second handle engaging said upper end of said third leg and the other one of said ends of said second handle engaging said upper end of said fourth leg.

11. The mechanic's service cart of claim 9, wherein:
   each said first portion of each said leg extender defining a first outer perimeter transversely oriented relative to said axial direction of said leg extender, one of said legs defining a second outer perimeter, said first outer perimeter conforming to said second outer perimeter; and each said second portion of each said leg extender defining a third outer perimeter transversely oriented relative to said axial direction leg extender, said third outer perimeter being configured to be received within one of said legs.

12. A mechanic's service cart, comprising:

a first leg, a second leg, a third leg and a fourth leg, each said leg being defined as an elongated tubular member of a first predetermined length in an axial direction, each said leg including an upper portion and a lower portion, each said upper portion including an upper end and each said lower portion including a lower end disposed generally opposite said upper end;

a tray being defined as a rigid load-bearing surface, said tray being carried between each said leg;

a plurality of leg extenders, each said leg extender comprising a tubular member extending in an axial direction with a first portion and a second portion, each said first portion including a first end and each said second portion including a second end disposed generally opposite said first end, each said first portion being contiguous with each said second portion, each said first end of each said leg extender engaging one of said legs, each said second end defining a first opening, each said leg extender being of smaller axial length than one of said legs;

a plurality of casters, each said caster comprising an axle, a wheel carried by said axle, an axle support assembly connected to said axle and a rigid shaft attached to said axle support assembly, each said rigid shaft engaging said second end of one of said leg extenders; and a plurality of bearing inserts, each said bearing insert comprising an insert member extending in said axial direction, each said bearing insert being received in said first opening and press-fit into said second end of one of said leg extenders; and a plurality of fasteners, wherein each said first portion of each said leg extender defines a hole, one said fastener securing one of said legs to said tray, said first end of one of said leg extenders defining a notch, said notch receiving one of said fasteners.

* * * * *